(12) United States Patent
Komoriya et al.

(10) Patent No.: US 10,363,970 B2
(45) Date of Patent: Jul. 30, 2019

(54) VEHICLE PILLAR STRUCTURE

(71) Applicant: TOYOTA JIDOSHA KABUSHIKI KAISHA, Toyota-shi, Aichi-ken (JP)

(72) Inventors: Kazuki Komoriya, Toyota (JP); Motoya Sakabe, Nisshin (JP); Koki Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 15/883,404

(22) Filed: Jan. 30, 2018

(65) Prior Publication Data

US 2018/0273102 A1 Sep. 27, 2018

(30) Foreign Application Priority Data

Mar. 27, 2017 (JP) ................................. 2017-061526

(51) Int. Cl.
*B60N 99/00* (2006.01)
*B62D 25/04* (2006.01)

(52) U.S. Cl.
CPC .................... *B62D 25/04* (2013.01)

(58) Field of Classification Search
CPC .................................................... B62D 25/04
See application file for complete search history.

(56) References Cited

U.S. PATENT DOCUMENTS 9,764,766 B2* 9/2017 Yoshida ............... B62D 21/157
9,821,853 B2* 11/2017 Torikawa ............. B62D 25/025

FOREIGN PATENT DOCUMENTS

JP 2006-273057 A 10/2006
JP 2010-058530 A 3/2010

\* cited by examiner

*Primary Examiner* — Lori L Lyjak
(74) *Attorney, Agent, or Firm* — Oliff PLC

(57) ABSTRACT

A vehicle pillar structure including: a pillar outer panel that extends with a length direction substantially in a vehicle vertical direction and configures a first part of a vehicle pillar, the vehicle pillar including a first column extending substantially along the vehicle vertical direction and a second column disposed at a predetermined spacing from the first column and extending substantially along the vehicle vertical direction; a pillar inner panel that configures a second part of the vehicle pillar, that extends with a length direction in the substantially vehicle vertical direction so as to face the pillar outer panel; and a weld portion at which an end in a short direction of one of the pillar outer panel or the pillar inner panel is abutted against a flat face provided at the other of the pillar outer panel or the pillar inner panel, and welded to the flat face.

6 Claims, 6 Drawing Sheets

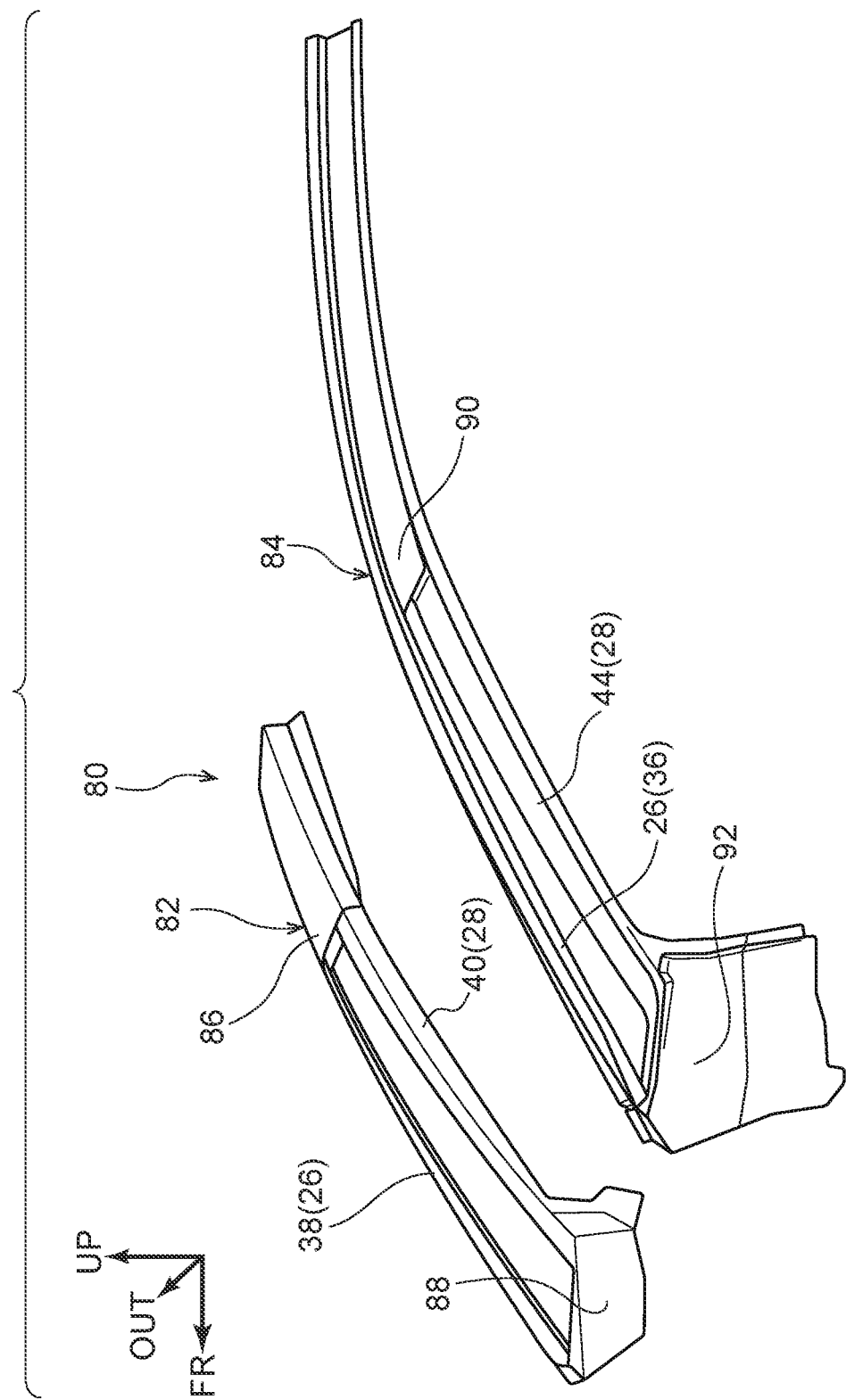

VEHICLE PILLAR STRUCTURE

CROSS-REFERENCE TO RELATED APPLICATION

This application is based on and claims priority under 35 USC 119 from Japanese Patent Application No. 2017-061526 filed on Mar. 27, 2017, the disclosure of which is incorporated by reference herein.

BACKGROUND

Technical Field

The present disclosure relates to a vehicle pillar structure

Related Art

Japanese Patent Application Laid-Open (JP-A) No. 2006-273057 describes a vehicle pillar structure.

This vehicle pillar structure includes a front pillar inner panel and a front pillar frame provided facing the front pillar inner panel, and a transparent member is retained between the front pillar inner panel and the front pillar frame. An opening is formed in the front pillar inner panel and the front pillar frame, penetrating in the plate thickness directions thereof. A driver is thereby able to check for objects on the far side of the front pillar by looking through the opening via the transparent member.

However, in the vehicle pillar structure described in JP-A No. 2006-273057, the bending rigidity of the vehicle pillar may be reduced due to the opening being formed in the vehicle pillar. The opening could be made smaller and the vehicle pillar made to form a closed cross-section structure in order to secure bending rigidity. When forming a closed cross-section structure, in order to secure flat faces having the surface area needed to join the opposing front pillar inner panel and the front pillar frame together, flanges that project toward the outer side of the vehicle pillar must be formed to both the respective front pillar inner panel and the front pillar frame. However, it is possible that these flanges would partially block the field of view of the driver. There is accordingly room for improvement on the related art in this respect.

SUMMARY

In consideration of the above circumstances, the present disclosure provides a vehicle pillar structure that enables a wide field of view while driving a vehicle to be secured, and that enables the rigidity of a vehicle pillar to be increased.

A vehicle pillar structure according to a first aspect of the present disclosure includes a pillar outer panel, a pillar inner panel, and a weld portion. The pillar outer panel extends with its length direction substantially in a vehicle vertical direction and configures part of a vehicle pillar, the vehicle pillar being configured including a first column extending along substantially the vehicle vertical direction and a second column disposed spaced at a predetermined spacing from the first column and extending substantially along the vehicle vertical direction. The pillar inner panel configures another part of the vehicle pillar, extends with its length direction substantially in the vehicle vertical direction, and is provided facing the pillar outer panel. The weld portion at which an end in a short direction of one out of the pillar outer panel or the pillar inner panel is abutted against a flat face provided at the other out of the pillar outer panel or the pillar inner panel and welded to the flat face.

A vehicle pillar structure according to the first aspect of the present disclosure includes the pillar outer panel and the pillar inner panel. The pillar outer panel extends with its length direction in substantially the vehicle vertical direction and configures part of the vehicle pillar, the vehicle pillar being configured including the first column extending along substantially the vehicle vertical direction and the second column disposed spaced at a predetermined spacing from the first column and extending along substantially the vehicle vertical direction. The pillar inner panel configures another part of the vehicle pillar, extends with its length direction in substantially the vehicle vertical direction, and is provided facing the pillar outer panel. The end in the short direction of one out of the pillar outer panel or the pillar inner panel is abutted against the flat face provided to the other out of the pillar outer panel or the pillar inner panel and joined to the flat face by the welded weld portion. Thus, a closed cross-section structure is formed by the pillar outer panel and the pillar inner panel using the weld portion, and a flange projecting toward the vehicle pillar outer side to join the pillar outer panel and the pillar inner panel together is not needed, enabling the cross-sectional area of the vehicle pillar to be reduced.

Note that "flat face" refers to a face that is flat in the in-plane direction of the other out of the pillar outer panel or the pillar inner panel, and flat faces may also include slightly undulated shapes or curved shapes so long as the extent thereof can be ignored with regard to its impact on the abutment of the one out of the pillar outer panel or the pillar inner panel.

A vehicle pillar structure according to a second aspect of the present disclosure is the first aspect, wherein in the vehicle pillar, an upper end of the second column is coupled to an upper end of the first column, and a lower end of the second column is coupled to a lower end of the first column. The vehicle pillar includes a transparent member that spans between the first column and the second column, and that enables the outside of a vehicle to be seen from a driving seat. At least one out of the first column or the second column is configured by the pillar inner panel and the pillar outer panel being joined together by the weld portion.

According to the second aspect of the present disclosure, in the vehicle pillar, the upper ends of the first column and the second column are coupled together, and the lower ends of the first column and the second column are coupled together. Namely, the vehicle pillar is configured by a substantially rectangular frame shaped profile configured including the first column and the second column. This allows a driver seated in the driving seat of the vehicle to see outside the vehicle, by looking through the inside of the vehicle pillar frame and through the transparent member that spans between the first column and the second column. This enables a wide field of view to be obtained while driving the vehicle.

At least one out of the first column or the second column is configured by the pillar inner panel and the pillar outer panel. The end in the short direction of one out of the pillar outer panel or the pillar inner panel is abutted against the flat face of the other out of the pillar outer panel or the pillar inner panel and joined to the flat face by the welded weld portion. This enables a closed cross-section to be formed by the pillar outer panel and the pillar inner panel, and a flange projecting toward the vehicle pillar outer side to join the pillar outer panel and the pillar inner panel together is not needed, enabling the cross-sectional area of the vehicle pillar to be reduced. Namely, at least one out of the first column or the second column can be configured by a closed cross-section structure, enabling the cross-sectional area thereof to be reduced. This enables the field of view at the vehicle pillar outer side of at least one out of the first column or the second column or the field of view through the inside the frame of the vehicle pillar to be widened.

A vehicle pillar structure according to a third aspect of the present disclosure is the second aspect, wherein one portion of the first column and one portion of the second column are configured so as to be integrated together as a unit by the pillar outer panel, and another portion of the first column and a remaining portion of the second column are configured so as to be integrated together as a unit by the pillar inner panel.

According to the third aspect of the present disclosure, one portion of the first column and one portion of the second column are formed so as to be integrated together as a unit in the pillar outer panel, and the other portion of the first column and the remaining portion of the second column are configured so as to be integrated together as a unit in the pillar inner panel. The end in the short direction of one out of the pillar outer panel or the pillar inner panel is abutted against the flat face provided to the other out of the pillar outer panel or the pillar inner panel and joined to the flat face by the welded weld portion. Thus, a closed cross-section structure is formed by the pillar outer panel and the pillar inner panel, and a flange projecting toward the vehicle pillar outer side to join the pillar outer panel and the pillar inner panel together is not needed, enabling the cross-sectional area of the vehicle pillar to be reduced. Further, the first column and the second column are configured by a single pillar inner panel and by a single pillar outer panel. This enables the number of components to be reduced compared to cases in which the first column and the second column are each configured as independent members.

A vehicle pillar structure according to a fourth aspect of the present disclosure is any one of the first to the third aspect, wherein at the weld portion, an outer face at a short direction end of one out of the pillar inner panel or the pillar outer panel is disposed substantially in the same plane as a short direction end face of the other out of the pillar inner panel or the pillar outer panel.

According to the fourth aspect of the present disclosure, the pillar outer panel and the pillar inner panel are joined together by the weld portion so as to form a closed cross-section structure, and a flange projecting toward the vehicle pillar outer side to join the pillar outer panel and the pillar inner panel together is not needed, enabling the cross-sectional area of the vehicle pillar to be reduced. Further, the outer face of the short direction end of one out of the pillar inner panel and the pillar outer panel is disposed substantially in the same plane as the short direction end face of the other out of the pillar inner panel or the pillar outer panel. This enables an attachment operation for a member, such as a pillar garnish, to be attached to the vehicle pillar, such as a pillar garnish, while the outer surface and the end face are disposed aligned substantially in the same plane as each other. Namely, this makes for easier attachment for an attachment member to the vehicle pillar.

A vehicle pillar structure according to a fifth aspect of the present disclosure is any one of the first to the third aspect, wherein at the weld portion, a short direction end of one out of the pillar inner panel or the pillar outer panel is disposed at an inner side at an in-plane direction of the other out of the pillar inner panel or the pillar outer panel with respect to a short direction end face of the other out of the pillar inner panel or the pillar outer panel.

According to the fifth aspect of the present disclosure, the pillar outer panel and the pillar inner panel are joined together by the weld portion so as to form a closed cross-section structure, and a flange projecting toward the vehicle pillar outer side to join the pillar outer panel and the pillar inner panel together is not needed, enabling the cross-sectional area of the vehicle pillar to be reduced. The short direction end of one out of the pillar inner panel or the pillar outer panel is disposed at the inner side in the in-plane direction of the other out of the pillar inner panel or the pillar outer panel with respect to a short direction end face of the other out of the pillar inner panel or the pillar outer panel. Accordingly, configuration is made in which the short direction end face of the other out of the pillar inner panel and the pillar outer panel, and thus an end of the other out of the pillar inner panel and the pillar outer panel, projects with respect to the short direction end of the one pillar inner panel or the pillar outer panel. This enables a member to be attached to the vehicle pillar to be positioned using this projecting end.

A vehicle pillar structure according to a sixth aspect of the present disclosure is any one of the first to the fifth aspect, wherein at the weld portion, a short direction end of the pillar inner panel is abutted against the flat face of the pillar outer panel and welded to the flat face.

According to the sixth aspect of the present disclosure, the short direction end of the pillar inner panel is abutted against the flat face of the pillar outer panel and welded to the flat face. Thus, a closed cross-section structure is formed by the pillar outer panel and the pillar inner panel, and a flange projecting toward the vehicle pillar outer side to join the pillar outer panel and the pillar inner panel together is not needed, enabling the cross-sectional area of the vehicle pillar to be reduced. Generally, a flat face having a certain surface area is needed in the pillar outer panel for joining a windshield glass or the like. The above configuration enables the short direction (width direction) dimension of the vehicle pillar to be reduced by a plate thickness amount of the pillar outer panel compared to cases in which the short direction end of the pillar outer panel is abutted against a flat face of the pillar inner panel and welded to the flat face.

The vehicle pillar structure according to the first aspect of the present disclosure exhibits the excellent advantageous effect of enabling a wide field of view while driving a vehicle to be secured, and of enabling the rigidity of a vehicle pillar to be increased.

The vehicle pillar structure according to the second aspect of the present disclosure exhibits the excellent advantageous effect of enabling an even wider field of view while driving a vehicle be secured, and of enabling the rigidity of a vehicle pillar to be increased.

The vehicle pillar structure according to the third aspect of the present disclosure exhibits the excellent advantageous effect of enabling a reduction in costs.

The vehicle pillar structure according to the fourth and the fifth aspects of the present disclosure exhibit the excellent advantageous effect of enabling the ease of assembly operations to be improved.

The vehicle pillar structure according to the sixth aspect of the present disclosure exhibits the excellent advantageous effect of enabling an even wider field of view to be secured while driving a vehicle to be secured, and of enabling the rigidity of a vehicle pillar to be increased.

BRIEF DESCRIPTION OF THE DRAWINGS

Exemplary embodiments of the present disclosure will be described in detail based on the following figures, wherein:

FIG. 6 is an exploded perspective view illustrating a vehicle pillar structure according to a second exemplary embodiment.

DETAILED DESCRIPTION

In FIG. 1 to FIG. 6, the arrow FR, the arrow OUT, and the arrow UP respectively indicate the front in a vehicle front-rear direction, outward in a vehicle width direction, and upward in a vehicle vertical direction.

First Exemplary Embodiment

Explanation follows regarding a first exemplary embodiment of a vehicle pillar structure according to the present disclosure, with reference to FIG. 1 to FIG. 5.

Figure 1:
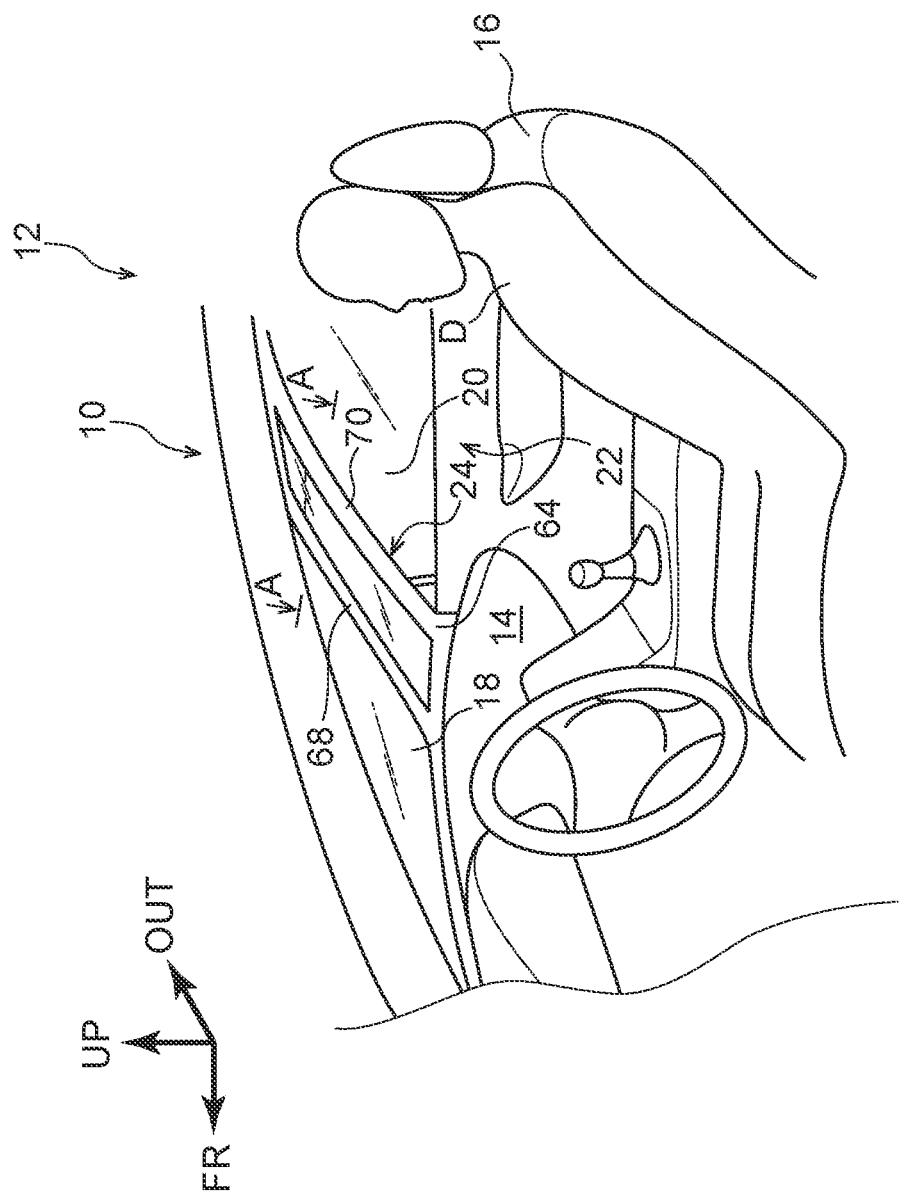
FIG. 1 is a schematic perspective view illustrating a vehicle cabin interior of a vehicle including a vehicle pillar structure according to a first exemplary embodiment.

As illustrated in FIG. 1, a vehicle 12 is applied with a vehicle pillar structure 10 according to the present exemplary embodiment, and inside a vehicle cabin 14 of the vehicle 12, a vehicle seat 16 employed as a driver seat is installed at a vehicle front. As illustrated in FIG. 1, a driver D sits in the vehicle seat 16.

A front windshield glass 18 is provided at the vehicle front of the driving-seat vehicle seat 16. The front windshield glass 18 is a transparent window member that separates the inside of the vehicle cabin 14 from the outside of the vehicle cabin 14, and has its plate thickness direction substantially in the vehicle front-rear direction. The front windshield glass 18 is inclined toward the vehicle rear on progression toward the vehicle upper side in side view. An upper end of the front windshield glass 18 is connected to a front header (not illustrated together in the drawings) configuring a front end of a roof. A hood covers an engine compartment, provided at the vehicle front, from the vehicle upper side. A lower end of the front windshield glass 18 is disposed facing a rear end of the hood in the vehicle front-rear direction, and is connected to a cowl extending in the vehicle width direction (neither of which is illustrated in the drawings).

The front windshield glass 18 is formed with a uniform plate thickness, and a vehicle width direction intermediate portion of the front windshield glass 18 is configured with a gently curving profile that protrudes toward the vehicle front. A pair of left and right front pillars 24 serving as vehicle pillars are respectively provided at vehicle width direction outer sides of the front windshield glass 18 and vehicle front sides of front doors 22 that each include a front side window 20.

The pair of left and right front pillars 24 each extend along a respective vehicle width direction end of the front windshield glass 18, with their length direction in substantially the vehicle vertical direction. Namely, the pair of left and right front pillars 24 are each inclined toward the vehicle rear on progression toward the vehicle upper side. Although explanation follows regarding the front pillar 24 on the opposite side to the driving seat, the front pillar 24 on the driving-seat side has a similar configuration.

Figure 2:
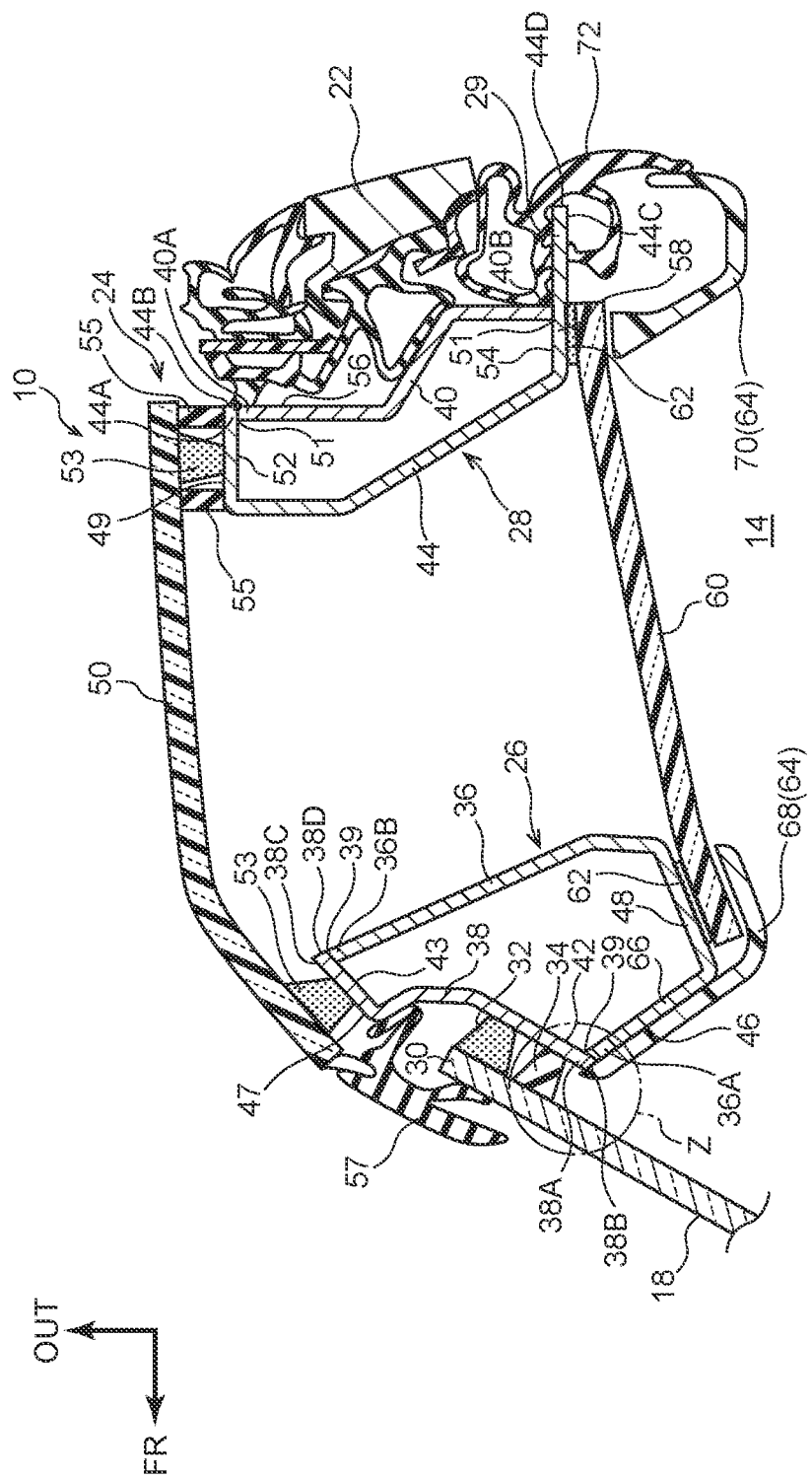
FIG. 2 is an enlarged cross-section illustrating a state sectioned along line A-A in FIG. 1.

As illustrated in FIG. 2, the front pillar 24 includes a first column 26 and a second column 28. The first column 26 extends along substantially the vehicle vertical direction, and a vehicle width direction end 30 of the front windshield glass 18 is joined to the first column 26 using a urethane adhesive 32 and cushioning rubber 34. The first column 26 is configured including a first pillar inner panel 36 and a first pillar outer panel 38. The first pillar inner panel 36 is made of sheet steel and serves as a pillar inner panel with a cross-section profile taken orthogonal to its length direction (extension direction along substantially the vehicle vertical direction) configured in a substantially U-shape open toward substantially the vehicle width direction outer side. The first pillar outer panel 38 is made of sheet steel and serves as a pillar outer panel with a cross-section profile taken orthogonal to its length direction (extension direction along substantially the vehicle vertical direction) configured in substantially a crank shape, and is provided so as to close the opening of the first pillar inner panel 36 from the vehicle width direction outer side. Namely, the first pillar inner panel 36 is provided facing the vehicle width direction inner side of the first pillar outer panel 38, and the first pillar outer panel 38 and the first pillar inner panel 36 are joined together by weld portions 39. A closed cross-section is thus formed by the first pillar outer panel 38 and the first pillar inner panel 36.

Figure 3:
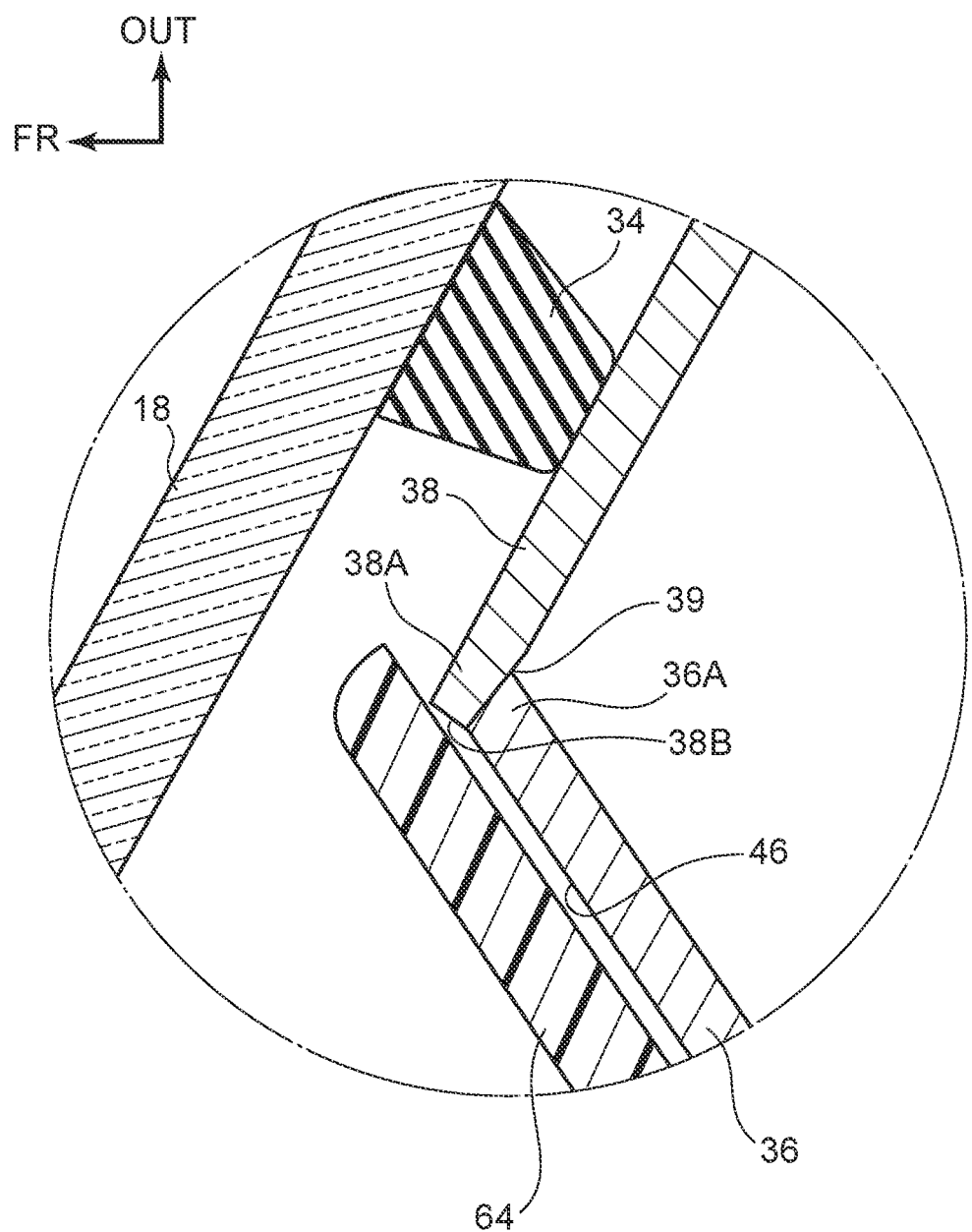
FIG. 3 is an enlarged view illustrating section Z in FIG. 2.

At the weld portions 39, short direction ends 36A, 36B of the first pillar inner panel 36 are respectively abutted against and welded to flat faces 42, 43 of the first pillar outer panel 38, which are faces that are flat in the in-plane direction of the first pillar outer panel 38. Note that the surface area needed for attachment of the front windshield glass 18 and a front pillar outer glass 50, described later, is secured by respective walls configuring the flat faces 42, 43 of the first pillar outer panel 38. As illustrated in FIG. 3, an outer face 46 of the short direction end 36A of the first pillar inner panel 36 and an end face 38B of a short direction end 38A of the first pillar outer panel 38 are disposed substantially in the same plane as each other.

As illustrated in FIG. 2, the second column 28 is disposed substantially at the vehicle rear of the first column 26. Specifically, the second column 28 is disposed spaced apart from the first column 26 by a predetermined spacing in substantially the vehicle front-rear direction. This predetermined spacing is set to be no less than the distance between the centers of the pupils of the driver D. Note that the "distance between the centers of the pupils" refers to a distance between the center of the pupil of the right eye (not illustrated in the drawings) of the driver D and the center of the pupil of the left eye (not illustrated in the drawings) of the driver D, and in the case of a Japanese adult, for example, is about 60 mm to 65 mm. In the present exemplary embodiment, the predetermined spacing is set to 65 mm, for example.

Further, the second column 28 extends substantially parallel (substantially along the vehicle vertical direction) to the first column 26 (see FIG. 1). The second column 28 is configured including a second pillar inner panel 44 and a second pillar outer panel 40. The second pillar inner panel 44 is made of sheet steel and serves as a pillar inner panel with a cross-section profile taken orthogonal to its length direction (extension direction along substantially the vehicle vertical direction) configured in a substantially U-shape open toward substantially the vehicle rear. The second pillar outer panel 40 is made of sheet steel and serves as a pillar outer panel with a cross-section profile taken orthogonal to its length direction (extension direction along substantially the vehicle vertical direction) configured in substantially a crank shape, and is provided so as to close the opening of the second pillar outer panel 40 from substantially the vehicle rear. Namely, second pillar inner panel 44 is provided facing the vehicle front of the second pillar outer panel 40, and the second pillar outer panel 40 and the second pillar inner panel 44 are joined together by weld portions 51. A closed cross-section is thus formed by the second pillar outer panel 40 and the second pillar inner panel 44.

At the weld portions 51, short direction ends 40A, 40B of the second pillar outer panel 40 are respectively abutted against and welded to flat faces 52, 54 of the second pillar inner panel 44, which are faces that are flat in the in-plane direction of the second pillar inner panel 44. An outer face 56 of the end 40A of the second pillar outer panel 40 and an end face 44B of a short direction end 44A of the second pillar inner panel 44 are disposed substantially in the same plane as each other. Further, the end 40B of the second pillar outer panel 40 is disposed at an inner side of the in-plane direction of the flat face 54 of the second pillar inner panel 44 with respect to an end face 44D of the short direction end 44A of the second pillar inner panel 44. Note that the surface area needed for attachment of the front pillar outer glass 50, described later, is secured by a wall configuring the flat face 52 of the second pillar inner panel 44.

Opening trim 72 is attached at the vehicle rear of a location where the short direction end 40B of the second pillar outer panel 40 contacts the flat face 54 of the second pillar inner panel 44, namely, to a flange 29. The opening trim 72 is positioned at a position contacting the second pillar outer panel 40. Further, a sealing member of the front door 22 is capable of contacting the second pillar outer panel 40. Note that the width dimensions of the first column 26 and the second column 28 are respectively set to be no greater than the distance between the centers of the pupils of the driver D when viewed in a substantially horizontal direction at the eye level (not illustrated in the drawings) of the driver D.

The front pillar outer glass 50, serving as a transparent member, spans between a vehicle width direction outer wall 47 of the first pillar outer panel 38 of the first column 26 and a vehicle width direction outer wall 49 of the second pillar inner panel 44 of the second column 28, via a urethane adhesive 53 and cushioning rubber 55. The front pillar outer glass 50 is a transparent window member with its plate thickness direction in substantially the vehicle width direction, and is inclined toward the vehicle rear on progression toward the vehicle upper side so as to run along the first column 26 and the second column 28 in side view. Note that a sealing member 57 is provided between the front pillar outer glass 50 and the front windshield glass 18, and the sealing member 57 suppresses the incursion of rain water and the like between the front pillar outer glass 50 and the front windshield glass 18. Further, the front pillar outer glass 50 is not limited to being configured from glass, and may be configured from a transparent, fiber-reinforced resin or the like.

A front pillar inner glass 60 is attached to a vehicle width direction inner wall 48 of the first pillar inner panel 36 of the first column 26 and a vehicle width direction inner wall 58 of the second pillar inner panel 44 of the second column 28 using an adhesive 62. The front pillar inner glass 60 is a transparent window member with its plate thickness direction in substantially the vehicle width direction, and is inclined toward the vehicle rear on progression toward the vehicle upper side so as to run along the first column 26 and the second column 28 in side view. Note that the front pillar inner glass 60 is not limited to being configured from glass, and may be configured from a transparent, fiber-reinforced resin or the like.

A front pillar garnish 64 is provided to a vehicle width direction inner side of both the first column 26 and the second column 28. The front pillar garnish 64 is made of resin, and is formed in a substantially rectangular frame shape that includes a garnish front portion 68 and a garnish rear portion 70 (see FIG. 1). From the vehicle cabin inside, the garnish front portion 68 covers the vehicle width direction inner wall 48 and a vehicle front wall 66 of the first pillar inner panel 36 of the first column 26, and covers a vehicle front end of the front pillar inner glass 60. From the vehicle cabin inside, the garnish rear portion 70 covers the vehicle width direction inner wall 58 of the second pillar inner panel 44 of the second column 28 and a vehicle rear end of the front pillar inner glass 60.

Operation and Advantageous Effects of the First Exemplary Embodiment

Explanation follows regarding operation and advantageous effects of the present exemplary embodiment.

The present exemplary embodiment includes the first pillar outer panel 38 and the second pillar outer panel 40 that configure part of the front pillar 24 and that extend with their length directions in substantially the vehicle vertical direction. The present exemplary embodiment also includes the first pillar inner panel 36 and the second pillar inner panel 44 that configure another part of the front pillar 24, that extend with their length directions in substantially the vehicle vertical direction, and that respectively face the first pillar outer panel 38 and the second pillar outer panel 40. The first pillar outer panel 38 and the second pillar outer panel 40 are respectively joined to the first pillar inner panel 36 and the second pillar inner panel 44 through the weld portions 39, 51 where the short direction ends 36A, 36B, 40A, and 40B of the first pillar inner panel 36 and the second pillar outer panel 40 are abutted against and welded to the flat faces 42, 43 of the first pillar outer panel 38 and the flat faces 52, 54 of the second pillar inner panel 44, respectively. Thus, the weld portions 39, 51 enable closed cross-section structures to be respectively formed by the first pillar outer panel 38 with the first pillar inner panel 36, and by the second pillar outer panel 40 with the second pillar inner panel 44. Moreover, no flanges projecting toward the outer side of the vehicle pillar are needed to join together the first pillar outer panel 38 and the second pillar outer panel 40 nor to join together the first pillar inner panel 36 and the second pillar inner panel 44, thereby enabling the cross-sectional area of the front pillar 24 to be made smaller. This enables a wider field of view while driving the vehicle to be secured, and enables the rigidity of the front pillar 24 to be increased. Further, no flanges are needed to join together the first pillar outer panel 38 and the second pillar outer panel 40, nor to join together the first pillar inner panel 36 and the second pillar inner panel 44. This enables a lightweight front pillar 24 to be achieved.

Further, the front pillar 24 includes the first column 26 extending along substantially the vehicle vertical direction, and the second column 28 that is disposed spaced apart from the first column 26 by a predetermined spacing in substantially the vehicle front-rear direction and that extends substantially parallel to the first column 26. Upper ends of the first column 26 and the second column 28 are coupled together, and lower ends of the first column 26 and the second column 28 are also coupled together. Namely, the front pillar 24 has a substantially rectangular frame shaped profile configured including the first column 26 and the second column 28. Thus, the driver D seated in the vehicle driving seat can see outside of the vehicle by looking through the inside of the front pillar 24 frame and through the front pillar outer glass 50 spanning the first column 26 and the second column 28. This enables a wider field of view while driving the vehicle to be obtained.

Note that the first column 26 is configured by the first pillar inner panel 36 and the first pillar outer panel 38. Further, the second column 28 is configured by the second pillar inner panel 44 and the second pillar outer panel 40. Thus, the weld portions 39, 51 enable closed cross-section structures to be respectively formed by the first pillar outer panel 38 with the first pillar inner panel 36, and by the second pillar outer panel 40 with the second pillar inner panel 44. Further, no flanges projecting toward the outer side of the front pillar 24 are needed to join together the first pillar outer panel 38 and the second pillar outer panel 40, nor to join together the first pillar inner panel 36 and the second pillar inner panel 44. This enables the cross-sectional area of the front pillar 24 to be reduced. Namely, both the closed cross-section structure and the cross-sectional area configured by the first column 26 and the second column 28 can be reduced. Thus, the configuration of the first column 26 and the second column 28 enables a wider field of view at the outer sides of the front pillar 24 and enables a wider field of view through the inside of the frame of the front pillar 24. This enables a wider field of view while driving the vehicle to be secured, and enables the rigidity of the front pillar 24 to be increased.

Figure 4:
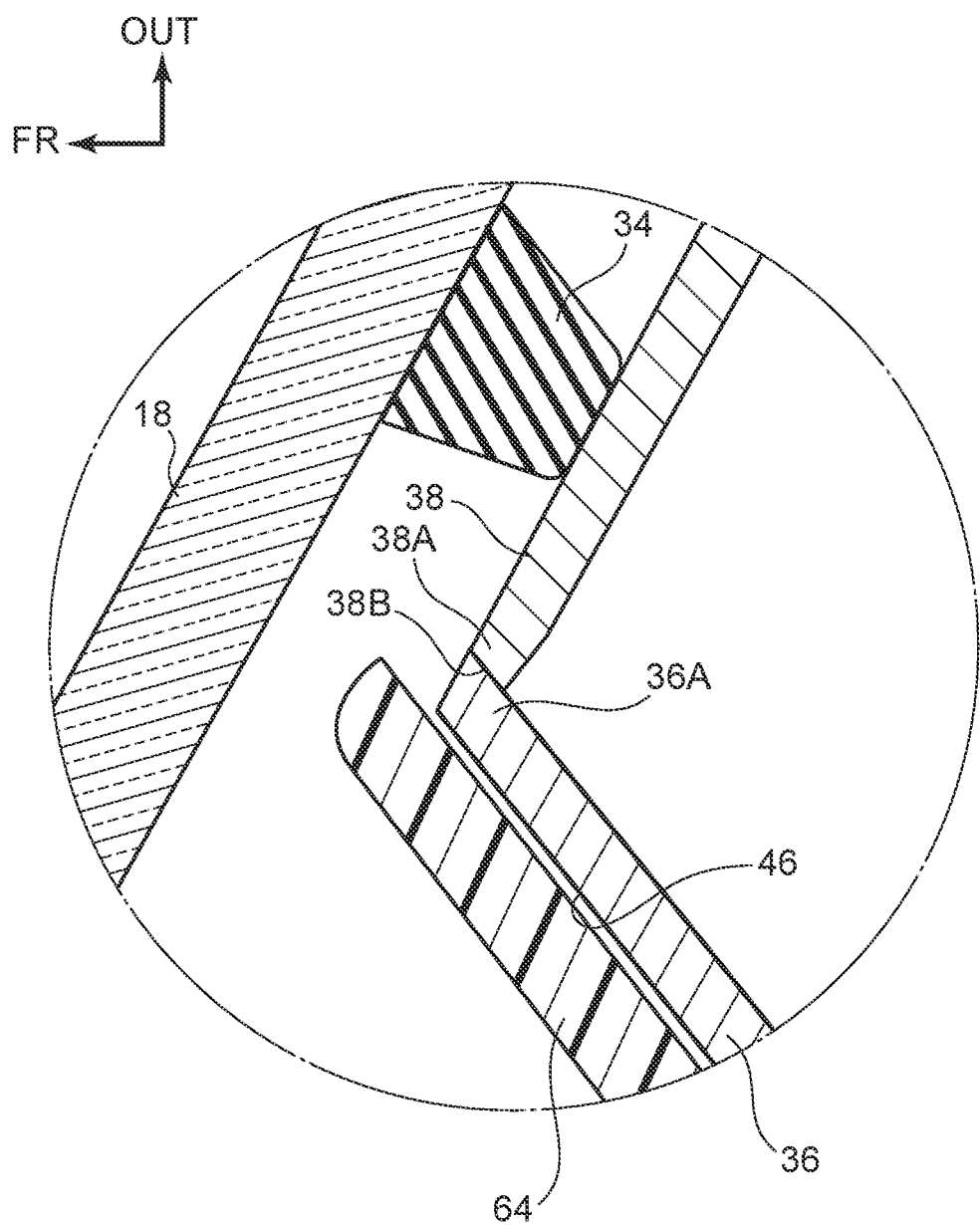
FIG. 4 is an enlarged view, corresponding to that of FIG. 3, illustrating a vehicle pillar structure according to a Comparative Example.

Moreover, at a weld portion 39, the short direction end 36A of the first pillar inner panel 36 is abutted against and welded to the flat face 42 of the first pillar outer panel 38. Generally, a flat face 42 having a certain surface area is needed in the first pillar outer panel 38 for joining a windshield glass or the like. Namely, as illustrated in FIG. 4, when a flat face 42 of the first pillar outer panel 38, in which the surface area needed for attachment of the front windshield glass 18 has been secured, is secured and the end face 38B of the first pillar outer panel 38 is abutted against and joined to the short direction end 36A of the first pillar inner panel 36, a front pillar garnish 64 is disposed by a plate thickness amount of the first pillar inner panel 36 to the outer side of the front pillar 24. In contrast thereto, in the present exemplary embodiment, as illustrated in FIG. 3, the short direction end 36A of the first pillar inner panel 36 is abutted against and welded to the flat face 42 of the first pillar outer panel 38, enabling the cross-sectional area of the first column 26 to be made smaller than in the Comparative Example of FIG. 4. In other words, the short direction (width direction) dimension of the front pillar 24 can be reduced by a plate thickness amount of the first pillar outer panel 38. This enables an even wider field of view while driving the vehicle to be secured, and enables the rigidity of the front pillar 24 to be increased.

Moreover, as illustrated in FIG. 2, the outer face 46 of the short direction end 36A of the first pillar inner panel 36 is disposed substantially in the same plane as the short direction end face 38B of the first pillar outer panel 38. This enables an attachment operation to attach a member, such as the front pillar garnish 64, to the front pillar 24 to be performed while the outer face 46 and the end face 38B are disposed aligned substantially in the same plane. Namely, this makes for easier attachment of an attachment member to the front pillar 24. This enables ease of assembly operation to be improved.

At a weld portion 51, the short direction end 40B of the second pillar outer panel 40 is disposed at the inner side of the in-plane direction of the second pillar inner panel 44 with respect to the short direction end face 44D of the second pillar inner panel 44. Accordingly, configuration is made in which the short direction end face 44D, and thus an end 44C of the second pillar inner panel 44, projects beyond the short direction end 40B of the second pillar outer panel 40, enabling the projecting end 44C to be used to position an attachment member, such as the opening trim 72, to the front pillar 24. This enables ease of assembly operation to be improved.

Figure 5:
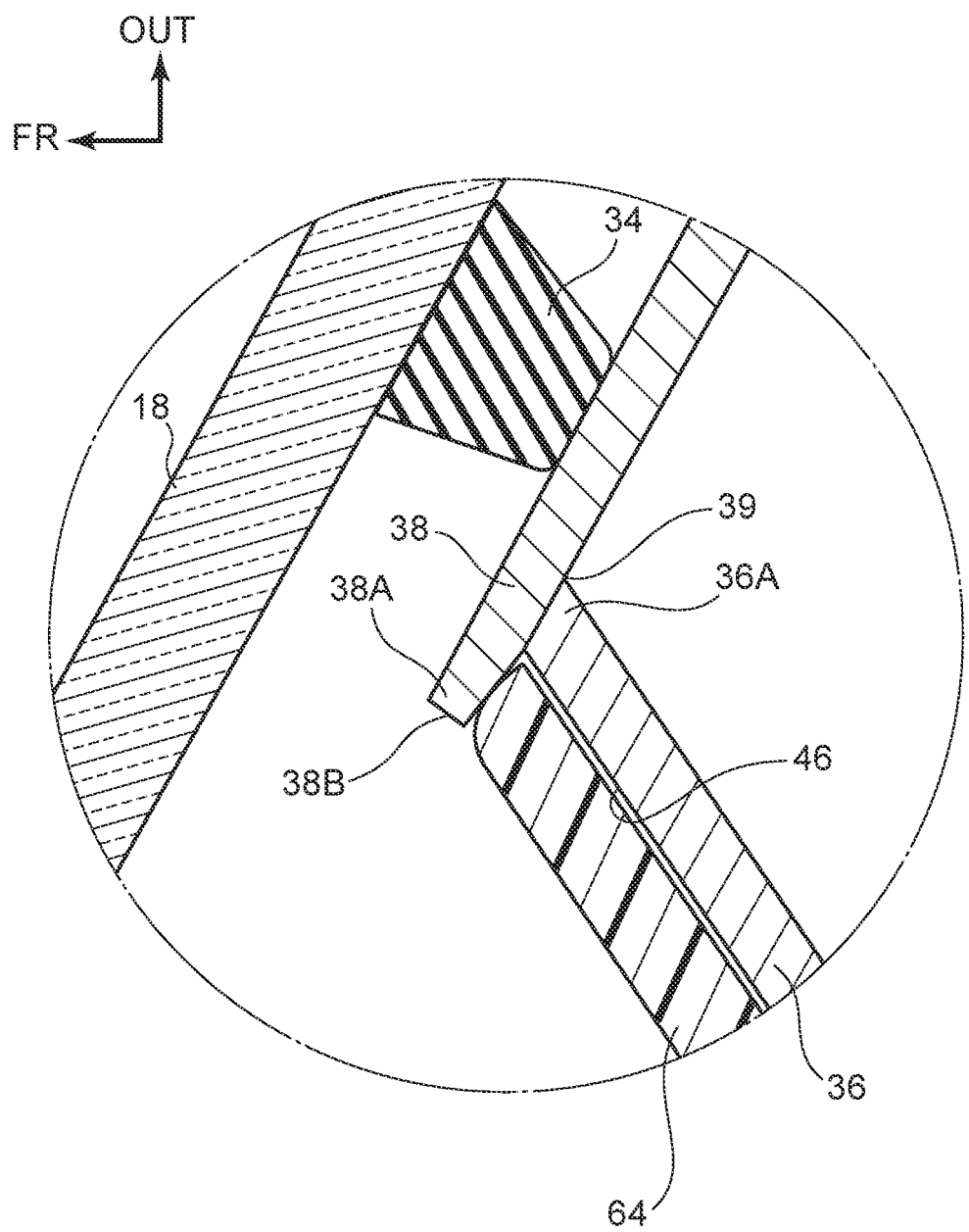
FIG. 5 is an enlarged view, corresponding to that of FIG. 3, illustrating a vehicle pillar structure according to a modified example of the first exemplary embodiment.

Note that in the exemplary embodiment described above, at a weld portion 39, configuration is made in which the short direction end 36A of the first pillar inner panel 36 is abutted against and welded to the flat face 42 of the first pillar outer panel 38; however, there is no limitation thereto. As illustrated in FIG. 5, configuration may be made in which the short direction end 36A of the first pillar inner panel 36 is disposed at an inner side of the in-plane direction of the first pillar outer panel 38 with respect to the short direction end face 38B of the first pillar outer panel 38. In this configuration, the short direction end 38A of the projecting first pillar outer panel 38 can be used to position the front pillar garnish 64. This enables ease of assembly operation to be improved. Similarly, as illustrated in FIG. 2, configuration may be made in which the short direction end 36B of the first pillar inner panel 36 is disposed at the inner side of the in-plane direction of the first pillar outer panel 38 with respect to an end 38D at a short direction end 38C of the first pillar outer panel 38. Moreover, configuration may be made in which the short direction end 40A of the second pillar outer panel 40 is disposed at the inner side of the in-plane direction of the second pillar inner panel 44 with respect to the short direction end face 44B of the second pillar inner panel 44.

Moreover, configuration is made in which the short direction end 40B of the second pillar outer panel 40 is disposed at the inner side of the in-plane direction of the second pillar inner panel 44 with respect to the short direction end face 44D of the second pillar inner panel 44. However, there is no limitation thereto, and configuration may be made in which the outer face of the short direction end 40B of the second pillar outer panel 40 is disposed substantially in the same plane as the short direction end face 44D of the second pillar inner panel 44.

Further, the first column 26 is configured by the first pillar inner panel 36 and the first pillar outer panel 38, and the second column 28 is configured by the second pillar inner panel 44 and the second pillar outer panel 40. However, there is no limitation thereto, and one out of the first column 26 or the second column 28 may be configured by a pillar inner panel and a pillar outer panel joined together by weld portions, with the other out of the first column 26 or the second column 28 having another configuration such as being formed by an extruded member.

Second Exemplary Embodiment

Explanation follows regarding a vehicle pillar structure according to a second exemplary embodiment of the present disclosure, with reference to FIG. 6. Note that portions that are configured basically the same as that of the first exemplary embodiment described above are appended with the same reference numerals, and explanation thereof is omitted.

As illustrated in FIG. 6, the basic configuration of a vehicle pillar structure 80 according to the second exemplary embodiment is similar to that of the first exemplary embodiment; but is distinctive in the point that the first pillar outer panel 38 and the second pillar outer panel 40 are configured so as to be integrated together as a unit in a pillar outer panel 82, and the first pillar inner panel 36 and the second pillar inner panel 44 are configured so as to be integrated together as a unit in a pillar inner panel 84.

Namely, the pillar outer panel 82 includes the first pillar outer panel 38 and the second pillar outer panel 40. Upper ends of the first pillar outer panel 38 and the second pillar outer panel 40 are coupled together as a unit via a coupling portion 86, and lower ends of the first pillar outer panel 38 and the second pillar outer panel 40 are coupled together as a unit via a coupling portion 88.

The pillar inner panel 84 includes the first pillar inner panel 36 and the second pillar inner panel 44. Upper ends of the first pillar inner panel 36 and the second pillar inner panel 44 are coupled together as a unit via a coupling portion 90, and lower ends of the first pillar inner panel 36 and the second pillar inner panel 44 are coupled together as a unit via a coupling portion 92.

From the vehicle width direction outer side, the pillar outer panel 82 is joined to the pillar inner panel 84 using the weld portions 39, 51 (see FIG. 2). Thus, the first column 26 and the second column 28 are each configured by a closed cross-section structure. In other words, one portion of the first column 26 and one portion of the second column 28 are configured by the pillar inner panel 84, and the remaining portion of the first column 26 and the remaining portion of the second column 28 are configured by the pillar outer panel 82.

Operation and Advantageous Effects of the Second Exemplary Embodiment

Explanation follows regarding operation and advantageous effects of the present exemplary embodiment.

Except in that the first pillar outer panel 38 and the second pillar outer panel 40 are configured so as to be integrated as a unit in the pillar outer panel 82, and in that the first pillar inner panel 36 and the second pillar inner panel 44 are configured so as to be integrated as a unit in the pillar inner panel 84, the above configuration is configured similarly to the vehicle pillar structure 10 of the first exemplary embodiment, and thus obtains similar advantageous effects to that of the first exemplary embodiment. Further, the first column 26 and the second column 28 are both configured from the single pillar inner panel 84 and the single pillar outer panel 82. This enables the number of components to be reduced compared to a case in which the first column 26 and the second column 28 are configured by independent members. This enables costs to be reduced.

Note that the vehicle pillar structure 10, 80 of the first and second exemplary embodiments described above is configured applied to the front pillar 24. However, there is no limitation thereto, and the vehicle pillar structure 10, 80 may be applied to some other vehicle pillar, such as a rear pillar or a quarter pillar.

Explanation has been given regarding exemplary embodiments of the present disclosure; however, the present disclosure is not limited thereto, and obviously various other modifications may be implemented within a range not departing from the spirit of the disclosure.

What is claimed is:

1. A vehicle pillar structure, comprising:
    a pillar outer panel that extends with a length direction substantially in a vehicle vertical direction and that configures a first part of a vehicle pillar, the vehicle pillar including a first column extending substantially along the vehicle vertical direction and a second column disposed at a predetermined spacing from the first column and extending substantially along the vehicle vertical direction;
    a pillar inner panel that configures a second part of the vehicle pillar, that extends with a length direction in the substantially vehicle vertical direction, and that is provided facing the pillar outer panel; and
    a weld portion at which an end in a short direction of one of the pillar outer panel or the pillar inner panel is abutted against a flat face provided at the other of the pillar outer panel or the pillar inner panel, and welded to the flat face.

2. The vehicle pillar structure of claim 1, wherein:
    in the vehicle pillar, an upper end of the second column is coupled to an upper end of the first column, and a lower end of the second column is coupled to a lower end of the first column;
    the vehicle pillar includes a transparent member that spans between the first column and the second column, and that enables an exterior to the vehicle to be seen as viewed from a driving seat; and
    at least one of the first column or the second column is configured by the pillar inner panel and the pillar outer panel being joined together by the weld portion.

3. The vehicle pillar structure of claim 2, wherein one portion of the first column and one portion of the second column are configured so as to be integrated together as a unit by the pillar outer panel, and another portion of the first column and a remaining portion of the second column are configured so as to be integrated together as a unit by the pillar inner panel.

4. The vehicle pillar structure of claim 1, wherein, at the weld portion, an outer face at a short direction end of one of the pillar inner panel or the pillar outer panel is disposed substantially in a same plane as a short direction end face of the other of the pillar inner panel or the pillar outer panel.

5. The vehicle pillar structure of claim 1, wherein at the weld portion, a short direction end of one of the pillar inner panel or the pillar outer panel is disposed at an inner side of an in-plane direction of the other of the pillar inner panel or the pillar outer panel with respect to a short direction end face of the other of the pillar inner panel or the pillar outer panel.

6. The vehicle pillar structure of claim 1, wherein at the weld portion, a short direction end of the pillar inner panel is abutted against the flat face of the pillar outer panel and welded to the flat face.

\* \* \* \* \*